Jan. 1, 1946. A. H. PEYCKE ET AL 2,392,291
INTEGRAL BRAKE ELEMENT
Filed Sept. 23, 1943 3 Sheets-Sheet 1
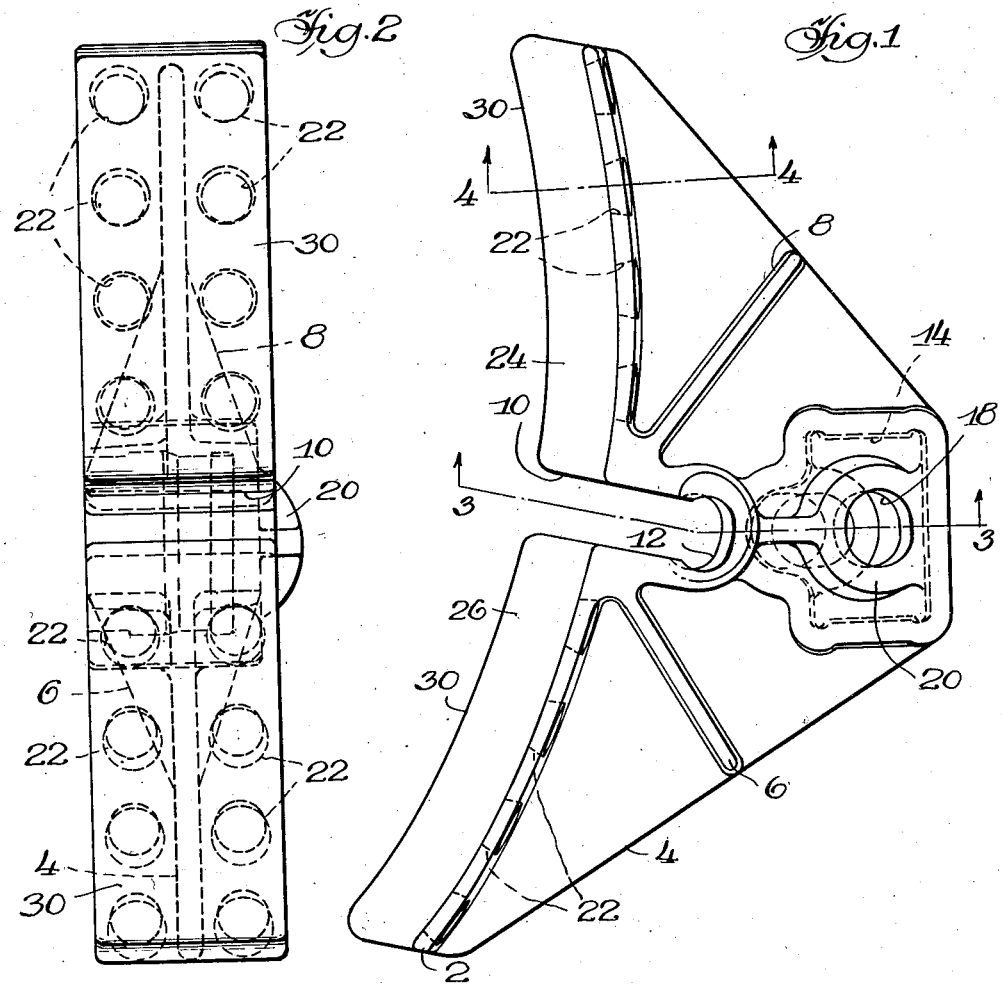
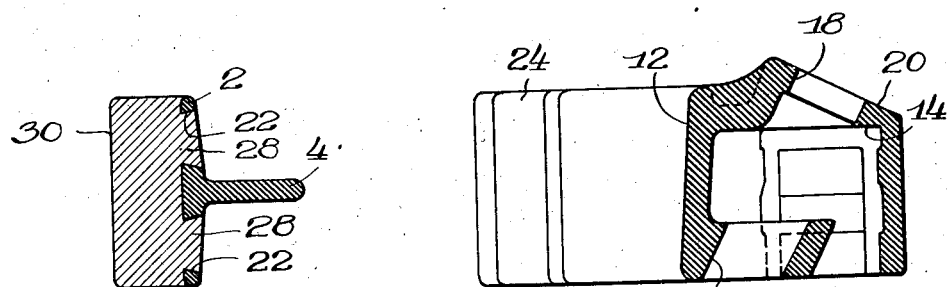
INVENTORS.
Armand H. Peycke
and Ray G. Aurien

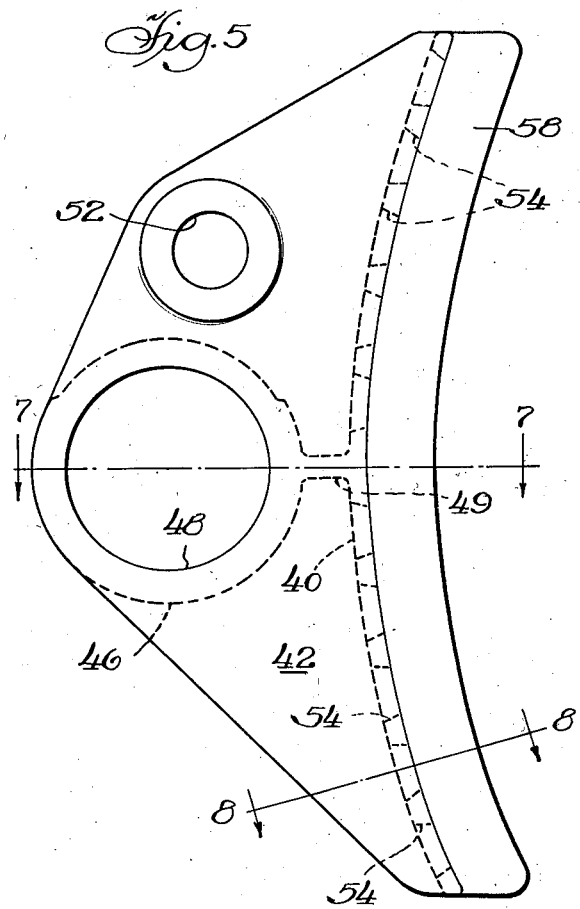
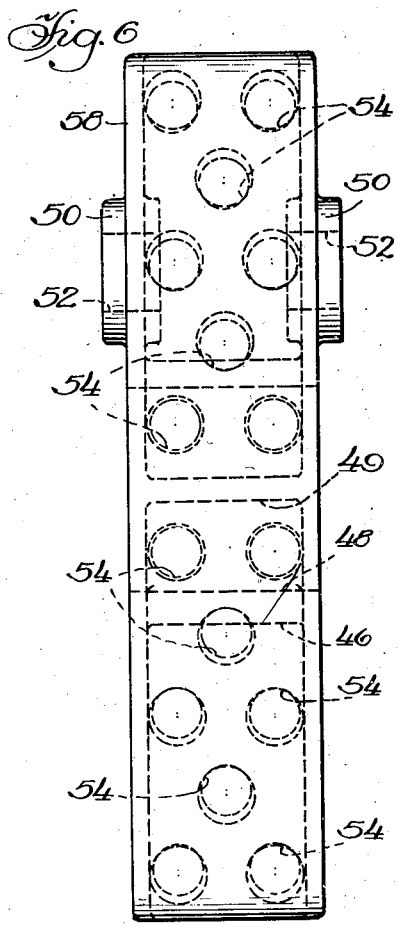
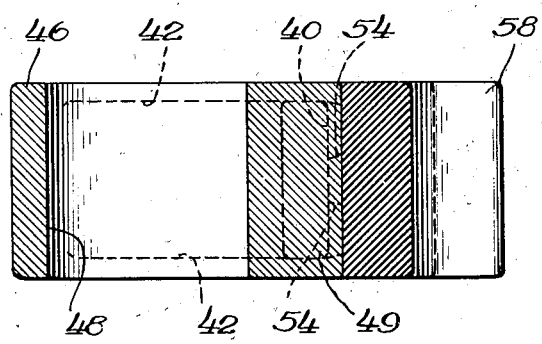
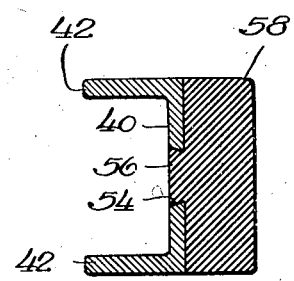

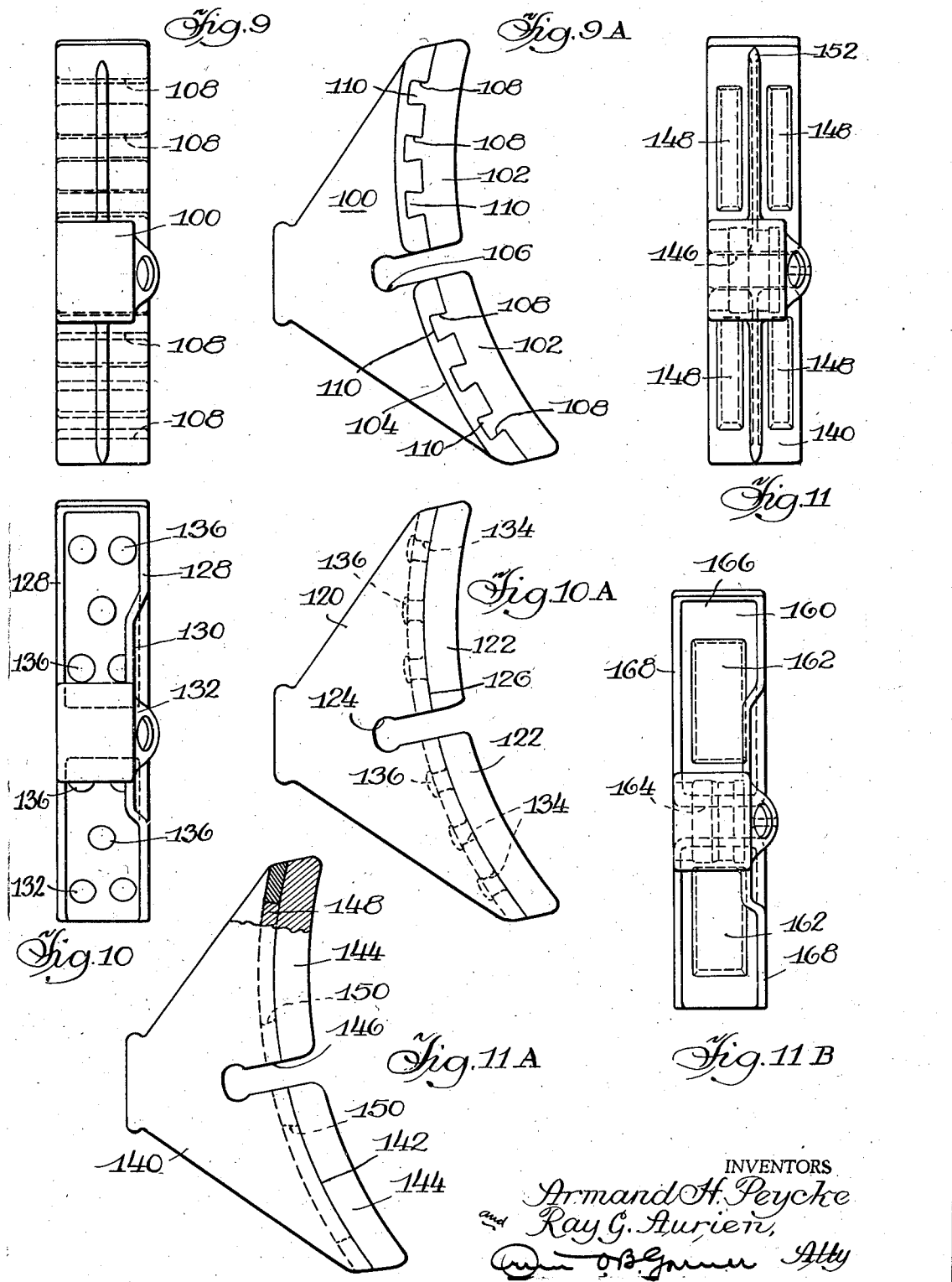

Patented Jan. 1, 1946

2,392,291

UNITED STATES PATENT OFFICE 2,392,291

INTEGRAL BRAKE ELEMENT

Armand H. Peycke and Ray G. Aurien, Chicago, Ill., assignors to American Steel Foundries, Chicago, Ill., a corporation of New Jersey Application September 23, 1943, Serial No. 503,458

11 Claims. (Cl. 188—242)

Our invention relates to brake heads for railway brakes particularly, and is equally applicable to the common type of freight brake head consisting of an arcuate web integrally formed with a single vertical web and provided with a pocket for connection to compression and tension members of the usual truss type freight brake beam, as well as to the sometimes designated passenger brake heads so arranged with an arcuate web and integrally formed spaced vertical webs within which may be formed one or more openings for association with trunnion portions of an associated lever or beam or hanger, or a combination thereof.

In both the passenger type and freight type of brake beams, the brake head is commonly arranged with means for supporting an associated brake shoe which is expected to be replaced as wear takes place. Under present conditions, it is exceedingly difficult to maintain the proper fixed relation between the brake head and the brake shoe which may be mounted thereon. The usual method of securing the brake shoe on the brake head is by means of an arcuate key passing through openings in interlaced key lugs on the head and shoe. Other difficulties arise, such as removal of the key itself if it is wedged in sufficiently securely to prevent relative movement between the head and shoe, breakage of the head or the shoe or parts of both resulting in relative looseness and uneven wear.

Our invention is designed to overcome these difficulties by eliminating entirely the use of separate brake heads and brake shoes and securing means therefor, such as a key, by making the brake head and brake shoe as a single integral structure built up as necessary of different materials in order to accommodate the dual purposes of the head and the shoe.

With this in mind, we have designed a novel arrangement of brake head and shoe combination as a single integral structure wherein that portion corresponding to the common brake head may be formed of a suitable material such as malleable iron or cast steel, and the other portion of the combination corresponding to the usual shoe may be formed of such abrasive resisting material as may be desired as for example, cast iron or special alloys, or a combination of reinforcing means around which said alloy or cast iron may be cast.

In the drawings,

Figures 1 to 4 illustrate one modification of our invention designed for use in place of the ordinary freight type of brake head, Figure 1 being a side elevation thereof, Figure 2 a front elevation taken from the left as seen in Figure 1, Figure 3 a sectional view taken approximately in the horizontal planes indicated by the line 3—3 of Figure 1, and Figure 4 a further sectional view taken in a horizontal plane approximately as indicated by the line 4—4 of Figure 1.

Figures 5, 6, 7 and 8 illustrate another embodiment of our invention as applied to a passenger type of brake head, Figure 5 being a side elevation thereof, Figure 6 a front elevation taken from the right as seen in Figure 5, Figure 7 a sectional view taken approximately in the horizontal plane indicated by the line 7—7 of Figure 5, and Figure 8 a further sectional view taken adjacent the end of the shoe in the diagonal plane indicated approximately by the line 8—8 of Figure 5.

Figures 9 to 11 inclusive illustrate various types of securing means between the brake head portion and the shoe portions of our novel brake head arrangement, equally applicable to brake heads of freight and passenger type, Figures 9, 10, 11 and 11B being front elevations, and Figures 9A, 10A and 11A being outlined side elevations corresponding respectively to the showings of Figures 9, 10 and 11.

Referring first in detail to the modification shown in Figures 1 to 4, our novel brake head arrangement illustrates a dual purpose structure comprising a structural portion and a wear portion, the structural portion corresponding to the usual brake head and the wear portion to the usual brake shoe. Said structural portion may be a cast member including an arcuate web 2 integrally formed with a vertical web 4, said vertical web being reinforced by the lower and upper diagonally arranged gussets or ribs 6 and 8. The arcuate web 2 may be interrupted approximately at the middle thereof by the hanger slot 10 and approximately in alignment with the arcuate hanger seat 12. At the inner end of said slot may be formed the usual compression member pocket 14 in the spaced walls of which may be formed aligned openings 16 and 18 (Figure 3) for accommodation of the tension member or rod and outwardly of the opening 18 may be formed the nut seat 20 in well known manner.

Above and below the brake hanger slot 10, the arcuate web 2 may be cored out to form a series of equally spaced openings 22, 22 on each side of the vertical web 4, the walls of said openings flaring or diverging toward the rear portion of the brake head structure. As illustrated in this modification, these openings may be approximately round with the axis of each approximately radial to the web 2.

The wear element of our novel structure may be cast as upper and lower portions 24 and 26 respectively above and below the hanger slot 10, each of said portions having a plurality of lugs 28, 28 (Figure 4) poured as an integral part of said securing element and solidifying within said before-mentioned aligned openings 22, 22 in the web 2. The wear element portions 24 and 26 may present spaced wear surfaces 30, 30 struck from a common center and designed for frictional engagement with the periphery of an associated wheel.

In this integral cast arrangement the structural portion will be formed of metal suitable for sustaining the shock customarily received by the brake head, while the wear element integrally cast as a part thereof may be formed of other wear withstanding material such as cast iron or other alloy.

In the modification illustrated in Figures 5 to 8 inclusive is illustrated a so-called passenger type of brake head arrangement, the structural portion whereof includes the arcuate web 40 integrally cast with the vertical side webs or walls 42, 42 at opposite edges of said arcuate web 40. Integrally joining the spaced walls or webs 42, 42 may be the cylindrical web 46 defining the opening 48 which may receive the trunnion portion of an associated beam (not shown). A rib 49 may join the cylindrical web 46 with the arcuate web 40. At the upper portions of the vertical webs 42, 42 may be formed the aligned bosses 50, 50 defining the hanger openings 52, 52. Above and below the rib 49 the arcuate web 40 may have a series of equally spaced openings 54, 54, said openings being defined by flaring walls diverging toward the rear of the brake head structure, as clearly seen in the side elevation view of Figure 5. Lugs 56, 56 (Figure 8) may be cast in each of the series of openings 54, 54 as integral portions of the wear element, generally designated 58, said wear element extending for the full length of the structure and being securely formed as a part thereof by means of said lugs 56, 56 cast within the openings 54, 54 as said wear portion is cast against the structural element.

In this modification we have illustrated the securing lugs as formed above and below the horizontal rib 49 as two parallel rows of spaced lugs and an intervening row of alternately arranged lugs, each of said lugs being equally spaced from adjacent lugs in other rows.

Figures 9 and 9A illustrate a modified arrangement for securing the structural portion 100 of a brake head arrangement to the wear portions 102, 102 thereof, said structural portion comprising an arcuate web 104 interrupted centrally thereof by the hanger slot 106, said web presenting on its wear portion engaging face a series of equally spaced transverse slots 108, 108 within which may be received transverse ribs 110, 110 cast as integral portions of the wear elements 102, 102.

Figures 10 and 10A illustrate modified means of securing the structural portion 120 of a brake head to the wear portions 122, 122 thereof above and below the hanger slot 124.

In this modification the structural member 120 is illustrated as comprising an arcuate web 126 integrally formed with the spaced vertical webs 128, 128 at the opposite edges thereof, one of said webs 128 being offset as at 130 to accommodate the nut seat 132. In this modification the arcuate web 126 above and below the hanger opening 124 is formed with a series of openings 134, 134, each of said openings 134 having cylindrical side walls instead of flaring walls. Each wear portion 122 may be cast with integral lugs 136, 136 extending through the openings 134, 134, and each lug 136 may have an enlarged head cast or welded thereon in abutment with the back face of the arcuate web 126, thus adequately securing the wear elements 122, 122 to the structural portion 120.

In the modification illustrated in Figures 11 and 11A the structural element 140 includes the arcuate web 142 and the wear portions 144, 144 positioned above and below the hanger slot 146. The wear portions 144, 144 may be cast against the arcuate web 142 and elongated lugs 148, 148 may be cast within the elongated slots 150, 150 formed in said arcuate web 142 above and below the hanger opening 146. As well seen in the view of Figure 11, parallel slots 150, 150 may be formed in the arcuate web 142 at opposite sides of the vertical web 152, and the side walls, as well as the end walls, of said slots may be flared as seen in Figure 11A in order to securely hold the lugs 148, 148 which may be cast therein.

Figure 11B illustrates a further arrangement comparable to that of Figure 11 in which, however, the structural element 160 is formed with a single elongated slot in the form of a rectangular opening with flaring side and end walls through which lugs 162, 162 above and below the hanger slot 164 may be cast as integral parts of the wear element, said wear element being secured to said structural element by means of said lugs in manner comparable to that illustrated in Figure 11. In the showing of Figure 11B, however, the structural element 160 is shown as comprising an arcuate web 166 integrally formed with webs or walls 168, 168 at opposite sides thereof, comparable to the arrangement in Figure 10.

Each of the above described modifications illustrates a brake head arrangement comprising a structural element having an arcuate web with a series of openings therein within which may be formed lugs cast integrally with wear portions which may be integrally formed as a part of the brake head structure by casting against the structural element. By this means the structural portion and the wear portion are formed as parts of an integral structure, thus preventing their working apart or breaking away from each other, as may occur in structures wherein the brake head and the brake shoe are separately formed and fixed with respect to each other by means of a third member in an arrangement comprising three or more pieces, all of which are subject to abrasion against each other and consequent wear and possible breakage, as already mentioned.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. A composite brake member comprising a shock resisting cast structural element having a vertical web and spaced arcuate webs with series of openings therethrough, a horizontal slot in said vertical web between said spaced webs, spaced wear resisting elements fixed to said arcuate webs above and below said slots with lugs extending through the adjacent openings and fixed therein, and means integrally formed with said webs affording connection to associated brake parts including a seat for an associated compression member defined by spaced walls, and aligned openings in said walls for an associated tension member.

2. A wheel engaging brake member comprising a shock resisting cast structural element having a vertical web and spaced arcuate webs with series of openings therethrough, a horizontal slot in said vertical web between said spaced webs, spaced wear resisting elements cast against said arcuate webs above and below said slot with lugs extending through the adjacent openings and welded therein, and means integrally formed with said webs affording connection to associated brake parts including a seat for a compression member defined by spaced walls, and aligned openings in said walls for an associated tension member.

3. In a wheel engaging brake element, a structural member of shock resisting material comprising a vertical web and an arcuate web interrupted by a transverse slot, parallel vertical elongated openings in said arcuate web above and below said slot, and wear resisting elements cast against said arcuate web above and below said slot with integral lugs extending through said openings, each of said openings having diverging end and side walls with the narrower portion of said opening adjacent the abutting wear resisting element.

4. A composite brake member comprising a cast structural element of shock resisting material having arcuate webs spaced by a transverse slot, and a vertical web, said arcuate webs having a series of spaced openings therethrough, and a plurality of wear resistant elements fixed to said arcuate webs above and below said slot with integral lugs fixed in said openings, each of said openings having walls diverging in a direction away from the adjacent wear resisting element.

5. In a composite brake element, a structural member of shock resisting material comprising a vertical web and an arcuate web, a transverse slot extending through said webs and defining an opening for the accommodation of a supporting member, openings in said arcuate web above and below said slot, and wear resisting elements fixed to said arcuate web above and below said slot with integral lugs extending into said openings, said openings being flared toward the extremities thereof remote from said elements.

6. A wheel engaging brake member comprising a shock resisting cast structural element having a vertical web and an arcuate web with a series of openings therethrough, diagonal ribs merging with said webs, a horizontal slot in said arcuate web, spaced wear resisting elements cast against said arcuate web above and below said slot with lugs extending through the adjacent openings and welded therein, and means on said vertical web affording connection to associated brake parts.

7. A wheel engaging brake member comprising a cast structural element of shock resisting material having arcuate webs spaced by a transverse slot, and a vertical web, said arcuate webs having a series of spaced openings therethrough, and a plurality of wear resistant elements cast against said arcuate webs above and below said slot with integral lugs fixed in said openings, each of said openings having walls diverging in a direction away from the adjacent wear resisting element.

8. A wheel engaging brake member comprising a shock resisting cast structural element having a vertical web and an arcuate web with a series of openings therethrough, diagonal ribs merging with said webs, a horizontal slot in said arcuate web, and spaced wear resisting elements cast against said arcuate web above and below said slot with lugs extending through the adjacent openings and welded therein.

9. A composite brake member comprising a shock resisting structural element having a vertical web and spaced transverse webs with a plurality of openings therethrough, a transverse slot in said vertical web between said spaced webs, spaced wear resisting elements fixed to said transverse webs above and below said slot with lugs extending through the adjacent openings and fixed therein, and means integrally formed with said webs affording connection to associated brake parts including a seat for a compression member defined by spaced walls, and aligned openings in said walls for an associated tension member.

10. In a composite brake member, a structural element of shock resisting material having arcuate webs and at least one vertical web integral therewith, a transverse slot extending through said webs, said slot terminating at its inner extremity in a seat for an associated supporting member for said brake member, a plurality of openings through said arcuate webs above and below said slot, and spaced wear resisting elements fixed to said arcuate web above and below said slot respectively and having integral lugs fixed in said openings, the adjacent edges of respective wear resisting elements being substantially coplanar with the top and bottom edges of said slot.

11. In a wheel engaging brake element, a structural member of shock resisting material comprising a vertical web and an arcuate web, a transverse slot, extending through said webs and defining an opening for accommodation of a supporting member, openings in said arcuate web above and below said slot, and wear resisting elements cast against said arcuate web above and below said slot with integral lugs extending in said openings, each of said openings having diverging walls.

ARMAND H. PEYCKE.
RAY G. AURIEN.